United States Patent [19]

Davini

[11] 4,239,431

[45] Dec. 16, 1980

[54] LIGHT-WEIGHT PROGRAM CONTROLLER

[75] Inventor: Giorgio Davini, Milan, Italy

[73] Assignee: Basfer S.r.L., Milan, Italy

[21] Appl. No.: 815,440

[22] Filed: Jul. 13, 1977

Related U.S. Application Data

[63] Continuation-in-part of Ser. No. 598,688, Jul. 24, 1975, abandoned.

[30] Foreign Application Priority Data

Oct. 22, 1974 [IT] Italy ................................ 28662 A/74

[51] Int. Cl.³ .......................... B05B 13/00; B25J 9/00; G05B 19/42
[52] U.S. Cl. ...................................... 414/1; 118/697; 239/69; 414/4; 414/730
[58] Field of Search .................. 318/568; 214/1 CM; 239/69, 178; 118/2, 4, 7, 11, 323, 696, 697; 414/1-7, 730

[56] References Cited

U.S. PATENT DOCUMENTS

| 2,213,108 | 8/1940 | Pollard, Jr. | 318/568 X |
| 2,344,108 | 3/1944 | Roselund | 118/323 |
| 3,312,562 | 4/1967 | Miller | 118/7 |
| 3,608,743 | 9/1971 | Mosher | 214/1 CM |
| 3,904,042 | 9/1975 | Colston | 214/1 CM |
| 3,923,166 | 12/1975 | Fletcher et al. | 214/1 CM |

*Primary Examiner*—Johnny D. Cherry
*Attorney, Agent, or Firm*—Robert E. Burns; Emmanuel J. Lobato; Bruce L. Adams

[57] ABSTRACT

A control system for programming operations of a spraygun robot for spraying paint comprises a mobile control structure having jointed parts of the robot, and also possesses transducers corresponding to transducers of the robot, for transforming electrical signals respectively from and into operations of the mobile structure and of the robot. The control structure is relatively light and mobile to facilitate manual operation. The robot is sufficiently massive and heavy to permit numerous operations of the joint devices thereof in a point-spray atmosphere.

3 Claims, 6 Drawing Figures

LIGHT-WEIGHT PROGRAM CONTROLLER

CROSS-REFERENCE TO EARLIER APPLICATION

This is a continuation-in-part of the earlier, copending application, Ser. No. 598,688, filed by the applicant on July 24, 1975, now abandoned.

BACKGROUND OF THE INVENTION

The present invention relates to an assembly of units for controlling an electronic apparatus designed to control a robot, such as a manipulation of a spray gun for spraying geometrically undefined workpieces and/or for spraying paint or varnish harmful to man, in suitable working programs.

Such "robots" comprise mechanical, hydraulic, and electronic parts.

The mechanical part carries a painting or varnishing gun, fitted to one end of a succession of arms connected to one another by articulated joints to provide a gun manipulator which possesses mobility of the single arms or parts, relative to one another.

The hydraulic part effects the moving of the arms or elements, by oil hydraulic actuators of known kind, for example, cams, cylinders and hydraulic motors.

The electronic apparatus is provided for cyclically repeating the robot's operations, for example ensuring the carrying out of the painting or varnishing operation as stored in a program storage unit.

The carrying out of the program's operating phases is ensured by transducers which control the exact position of the single arms or other single components of the mechanical part, by electric pulses sent to a central control unit.

The central control unit, if the electric signals generated by the controlling transducers do not agree with electric signals stored in the working storage unit, sends the required electric pulses to a servovalve control of the oil hydraulic actuators until the positional errors of the varnishing guns are fully eliminated. Similar programming is applied to the control of paint or vanish emission by the operating paint gun.

Several technical possibilities, relating to the storage of the varnishing or painting operating phases in the storage unit, are known.

A first possibility consists in developing a program to be stored which renders as close as possible all operating phases of the "robot." A drawback of this possibility is the rather heavy cost of development of such a program, so that such a technique is only justified for costly objects to be painted. Another drawback is due to the fact that the program is possible only for simple geometric-outline objects.

Another possibility is based upon an operating "robot" for transforming the data relating to the spatial and directional position of the spray gun and to the amount of varnish or paint delivered by the same into suitable electric signals to be stored in the working storage unit of the electronic apparatus, by cooperation of a skilled operator with an operating robot manipulator which with a gun, controlled by the operator's hand, varnishes or paints a suitable object as required. This possibility too entails several drawbacks. A first drawback is caused by the considerable friction effects and the inertia in the controlling "robot." Another drawback, consequent to the first one, is caused by the poor controllability of the group "spray gun—robot" entailing an inevitable inaccuracy in the varnishing of an object controlled by the operator, especially when dealing with objects presenting irregular surfaces.

SUMMARY OF THE INVENTION

The above-mentioned drawbacks are overcome by using the device of the present invention, which comprises the device of the present invention, which comprises a movable controlling or teaching structure the single parts of which are equal in number and in geometrical outline to the parts constituting the working or painting robot; the teaching structure being of lesser weight and bulk than the painting robot, but presenting at the same time the same degrees of freedom and patterns of movement as the latter. An operating spray gun can be carried at one end of the teaching structure, and can be equal to a spray gun carried by the corresponding end of the painting robot. Thus, the spray gun carried by the teaching structure is easily handleable in space, time and required manner by an operator, for providing the electronically stored painting program, while the painting robot or robots have sufficient bulk and weight to use joints and the like, which remain operable in many repeat performances of the program, even in the aggressive spray-paint atmosphere.

BRIEF DESCRIPTION OF THE DRAWINGS

Further details and advantages of the present invention will become more evident from the following description of preferred embodiments thereof, without being limited thereto, and on hand of the accompanying drawings, in which.

DESCRIPTION OF THE PREFERRED EMBODIMENTS

Figure 1:
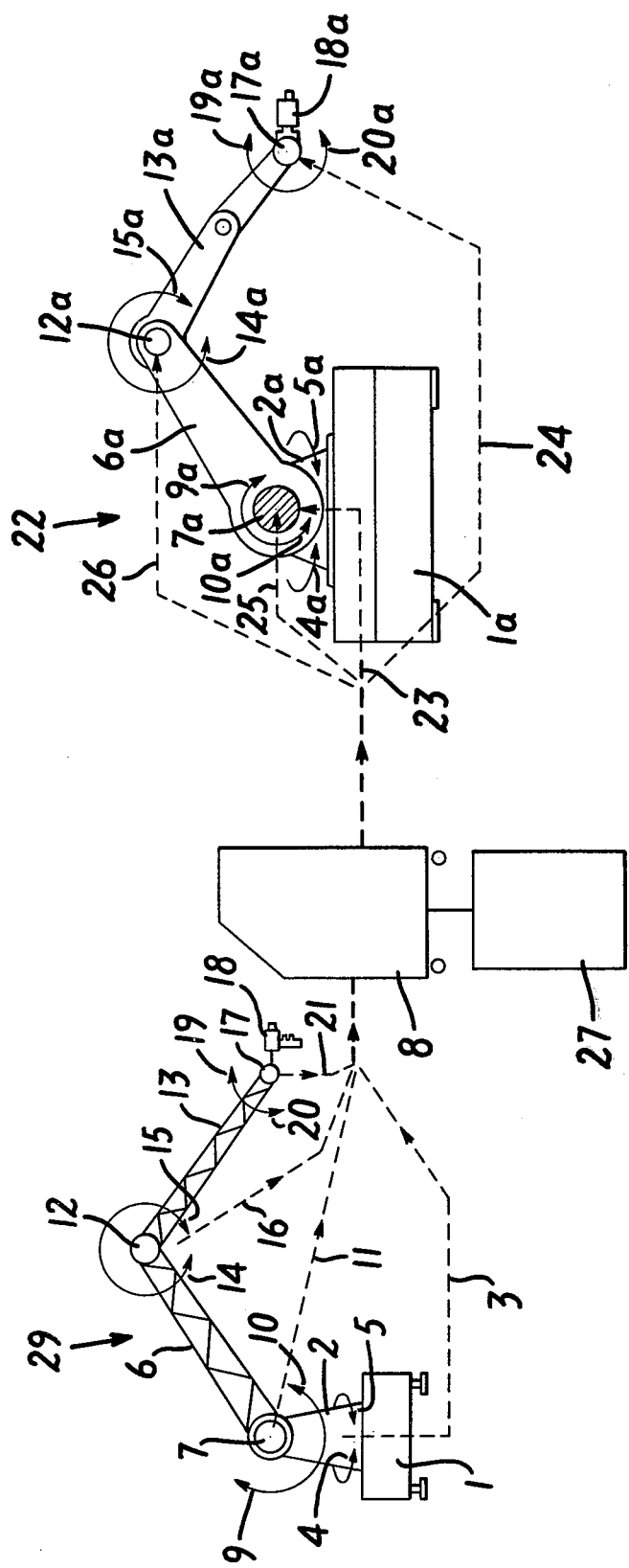
FIG. 1 is a schematic representation, in side view, of a first embodiment of the invention.

Referring first to FIG. 1, 29 indicates the assembly of elements constituting the mobile teaching structure of the present invention. In this assembly, 1 is a supporting base carrying a taper-trunk tower 2 having a diameter decreasing from the bottom to the top. The tower 2 can revolve around its vertical axis in both directions as indicated by the arrows 4 and 5. The revolving motions of the tower are translated into corresponding electric signals by a suitable positional transducer, in particular by a "resolver," diagrammatically represented here by the arrows 4 and 5 and the function of which is indicated in FIG. 1 by the broken line 3. It will be understood that it transmits electric signals to an electronic apparatus 8 having a feeder 27 for storing the electric signals.

To the top of the tower 2 the end of a first arm 6 is coupled by means of a hinge structure 7. The first arm 6 can rotate in clockwise and counterclockwise directions around the hinge structure 7, as indicated by the arrows 9 and 10. The rotations of the first arm 6 are translated into the corresponding electric signals by a suitable transducer diagrammatically shown as an element of the hinge structure 7; the signals being represented by broken line 11, and being transmitted to the storage unit 27.

The other end of the first arm 6 is coupled by means of a hinge structure 12 to the end of a second arm 13, which can rotate in clockwise or counterclockwise directions, as shown by the arrows 15 and 14, around the hinge structure 12. The rotary movements of the second arm 13 about the hinge structure 12, relatively to the first arm 6, as in the case of this latter one, are translated and signalled or transmitted as indicated by broken line 16. For this purpose of course, the hinge structure includes motion-signal transducer means, known to persons skilled in the art and shown herein only as elements of structure 12.

The other end of the second arm 13 is coupled by means of a similar hinge structure 17 to an operating device 18 comprising a paint spray gun. The spray gun 18 is thus allowed to rotate around the hinge structure 17 in clockwise and counterclockwise direction as shown by the arrows 19 and 20; again, as outlined hereinabove, the rotary movements of the paint spray gun 18 around the hinge 17 are translated into electric signals by a suitable transducer, and the signals are then transmitted to the workking storage unit as indicated at 21. The assembly 29 of tower 2, arms 6, 13 and spray gun 18 has a general geometrical outline and pattern of movements, identical with the general geometrical outline and the pattern of movements of corresponding parts 2a, 6a, 13a, 18a in a painting robot 22; however, the parts of the painting robot are bulkier, and correspondingly heavier, particularly as they are interconnected by more durable joints 7a, 12a, 17a, which can operate successfully in repeated cycles, in the spray-paint atmosphere.

The painting robot 22 comprises a sizable, supporting base 1a, carrying a massive tower 2a movable like the tower 2 in the directions indicated by the arrows 4a and 5a; on top of the tower 2a the end of the first arm 6a is coupled thereto by means of hinge 7a, the free end of the arm 6a being coupled by means of hinge 12a to the corresponding end of the second arm 13a.

The first arm 6a and the second arm 13a are endowed relatively and respectively to the tower 2a and to the first arm 6a with the same movements observed for the first arm 6 and second arm 13 of the assembly 29. These movements of the first and second arms of the robot 22 are indicated, respectively, by the arrows 9a, 10a, 15a, 14a. At the free end of the second arm 13a of robot 22 we find the operating paint spray gun 18a. The drive of the robot 22 is effected, and transmitted to the arms thereof, by devices which can operate successfully, in repeated cycles, in the working space and atmosphere of the robot, which is by structures hinged in articulated joints, and spaces, saturated with paint from spray gun 18a. Such an atmosphere is very aggressive to mechanical parts, such as bearings. Therefore, the robot 22, as indicated in the drawing, has bearings or hinges of substantial size, and has correspondingly bulky arms. It is, correspondingly, quite heavy. The massive and heavy arm and tower structures are, however, effectively operated by drive means of adequate power output, under the exact and adequately fine control of the electronic transducers, or particularly, resolvers which are fixed to the points corresponding to those in the assembly of elements 29 provided with transducers. These transducers, fitted to the robot, are connected to the working storage unit 27 of electronic apparatus 8, by means of cables 23, 25, 26 and 24.

As the movable structure forming the teaching assembly 29 uses arms of limited weight and bulk, the program produced by this assembly and stored in apparatus 8 is not impeded by undue inertia of parts, because of the almost total absence of such weight, bulk, friction and inertia as needed in robots 22. The operator can point the spray gun with much ease and rapidity, ensuring the uniform or proper distribution of the paint even, on quite irregular surfaces.

Figure 2:
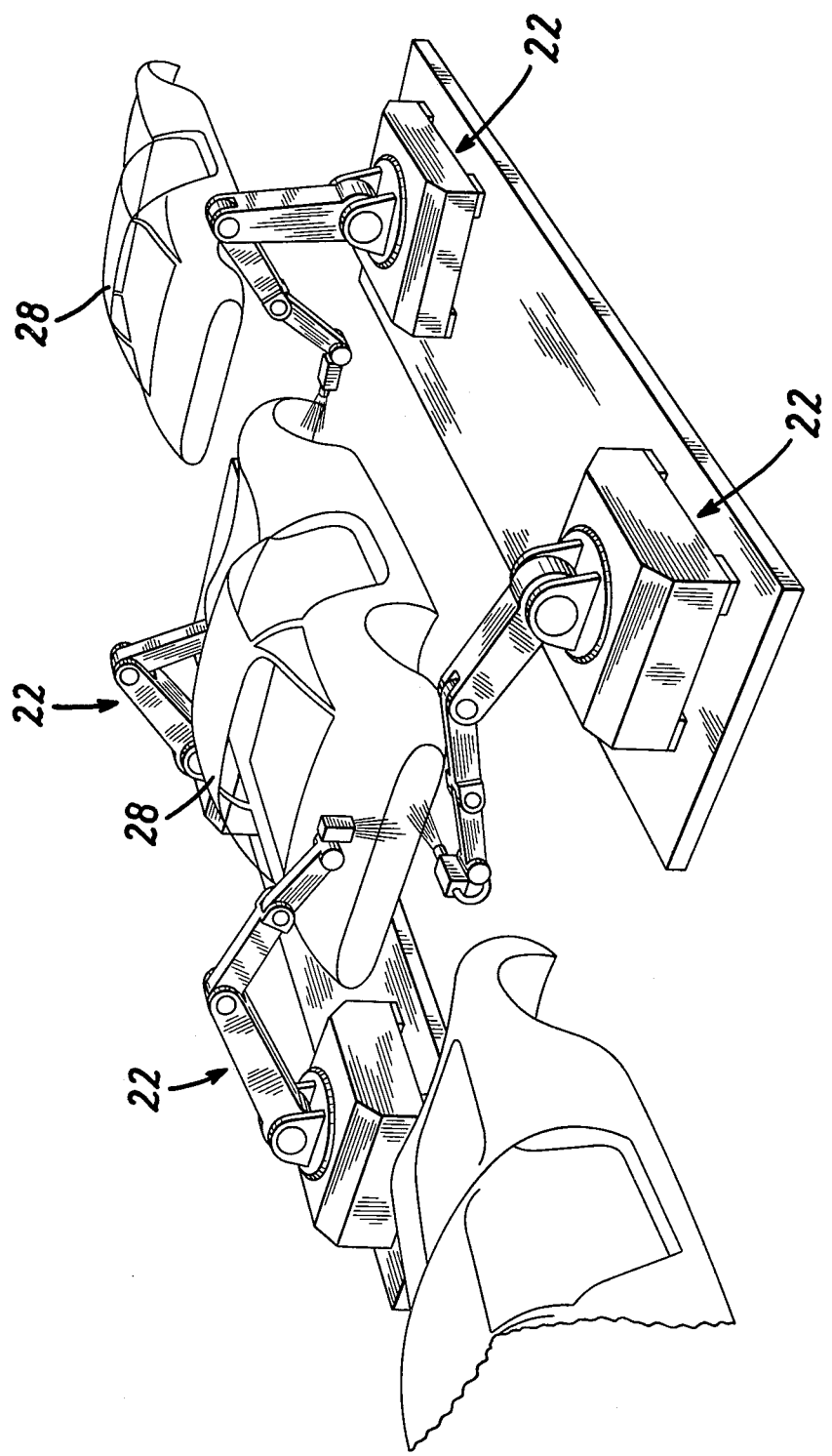
FIG. 2 is a perspective view showing several units of a painting robot part of FIG. 1.

In the operation of the device of FIGS. 1 and 2, usually a plurality of objects are to be varnished or painted for example, a plurality of car bodies 28 (FIG. 2). Each robot 22 has a determined taks, for example, the varnishing of a given part of a car body 28. Each robot will follow the instructions of a stored working program produced by the teaching apparatus 29 and entrusted to a corresponding storage unit in part 27 of the electronic apparatus 8.

Once the connections between the lines 3, 11, 16 and 21 and the storage unit have been carried out, the controlling paint spray gun 18 is gripped by a skilled worker who moves it to varnish in the best possible manner a part of a model car body to be painted (not shown in FIG. 1). The movable structure comprising the tower 2, first arm 6, second arm 13 and hinges 7, 12 and 17, being of bulk and weight rather limited as compared to the corresponding and similar structure of the robot 22, does not oppose any appreciable inertia or friction to the movements of the controlling paint gun.

Together with the manual spray-painting of an object carried out by an expert operator or painter, the transducers in the assembly 29 store and transmit the position and direction of the gun as well as the rate of output of paint. Once the painting of the desired portion of a car body has been completed, manually, in this way, the working phases relating to this operation have been perfectly stored in unit 27. When it is now desired to let the storage unit carry out an optimal, automatic painting operation on car bodies 28 (FIG. 2), the painting of these car bodies is performed by the massive robot or robots 22 in exactly the same way, as to supply and aiming of the paint sprays, as the expert worker performed it with the more mobile teaching apparatus 29.

The flow data sent by the transducers from the assembly 29 to the electronic apparatus 8 is controlled in the latter by a central control unit formed of a microcomputer suitably programmed by means of digital electronic techniques, and by the storage unit 27, as will be understood from the above.

As soon as the program has been stored, the connection between the electronic apparatus 8 and the cables 3, 11, 16 and 21 is interrupted. The apparatus 8 is now connected to the cables 23, 24, 25 and 26 leading to the transducers of the robot 22. Each robot 22 can then repeatedly carry out the painting operation on a plurality of equal body units 28. In this process, each movement of each robot 22 is closed-loop controlled by interlocking elements of the electronic apparatus 8, using for this purpose the transducers provided in the robot. Each of the latter transducer sends electric signals relating to its hinge to the central control unit which compares them with those stored in the storage unit. If any consecutive positions of the paint spray gun 18a do not agree with those required by the storage unit, the central control unit controls servo-valves of hydraulic actuators, not shown, to eliminate the position errors, independently of any variation of the ambiental conditions such as the temperature, pressure and load.

If the storage unit of the electronic apparatus 8 is designed to store eight different programs, it follows that each robot can execute as many different painting operations suitable for this robot's operation on corresponding types of cars 28. Each operational program being recorded on a separate record, it is evident that, when it is desired to change a given detail, it will be sufficient to remove the data to another record and insert the new data into the record after having them programmed and developed on the assembly of elements 29, or else, taking them from an archived record when desiring an old program, suitable for this robot's operation on corresponding types of cars 28.

Reference will now be made to the modified embodiment of FIGS. 3 to 6. Here, corresponding parts have the same reference numbers as in FIGS. 1 and 2.

Figure 3:
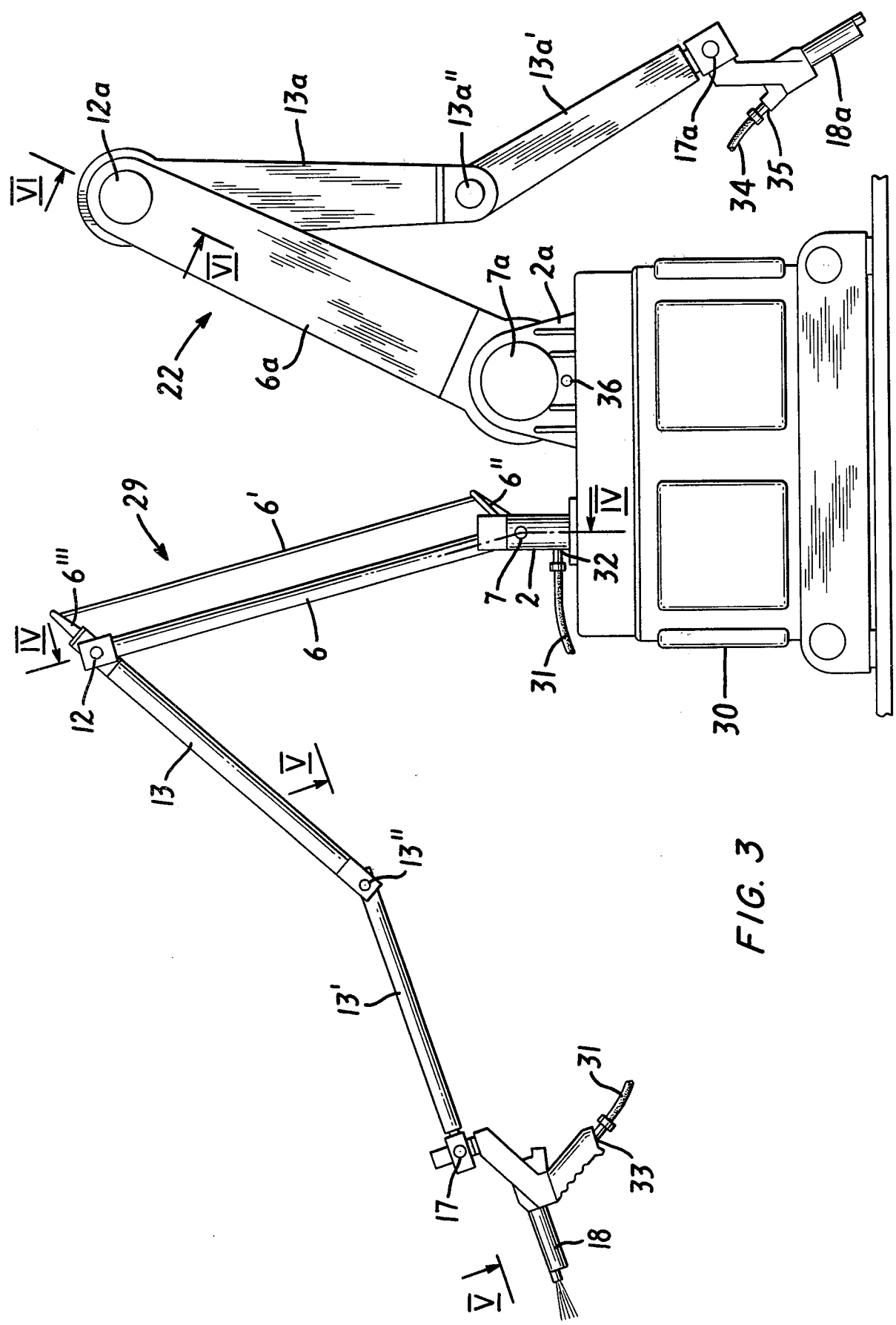
FIG. 3 is a view generally similar to FIG. 1 but showing a modified embodiment.

As shown in FIG. 3, a painting robot structure 22 and a relatively light, mobile control or teaching apparatus 29 can be mounted on a single and common base 30, which can contain a supply of paint for use by the teaching apparatus, and a supply of substantially identical paint for the painting robot. For this purpose, base 30 may be hollow and may be largely filled with the paint. The paint is supplied to the control spray gun 18 through a flexible hose 31 which for this purpose is shown as being connected to the tower 2 at 32 and to the spray gun 18 at 33. The remainder of the hose is omitted in the drawing; it will be understood that this hose can be suitably draped on and along the several arms 6,13 of the control structure. A hose 34 is similarly connected to the spray gun 18a of the painting robot 22 at 35 and to the tower 2a of this robot at 36. The paint is supplied to the hoses, from the base, for example by well known apparatus (not shown), for keeping the paint supply under pressure.

Figure 4:
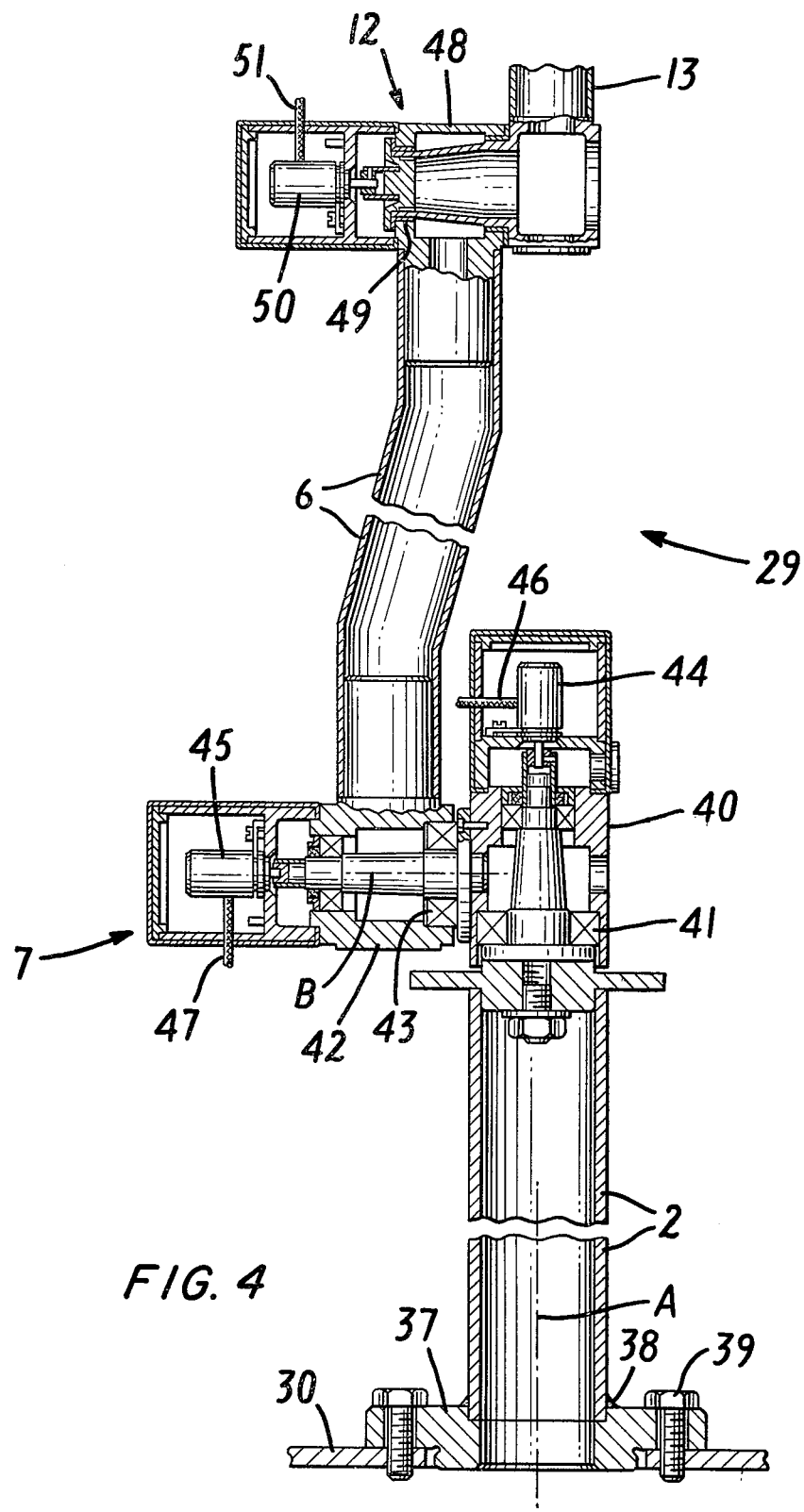
FIGS. 4 to 6 are details from FIG. 3.
Figure 5:
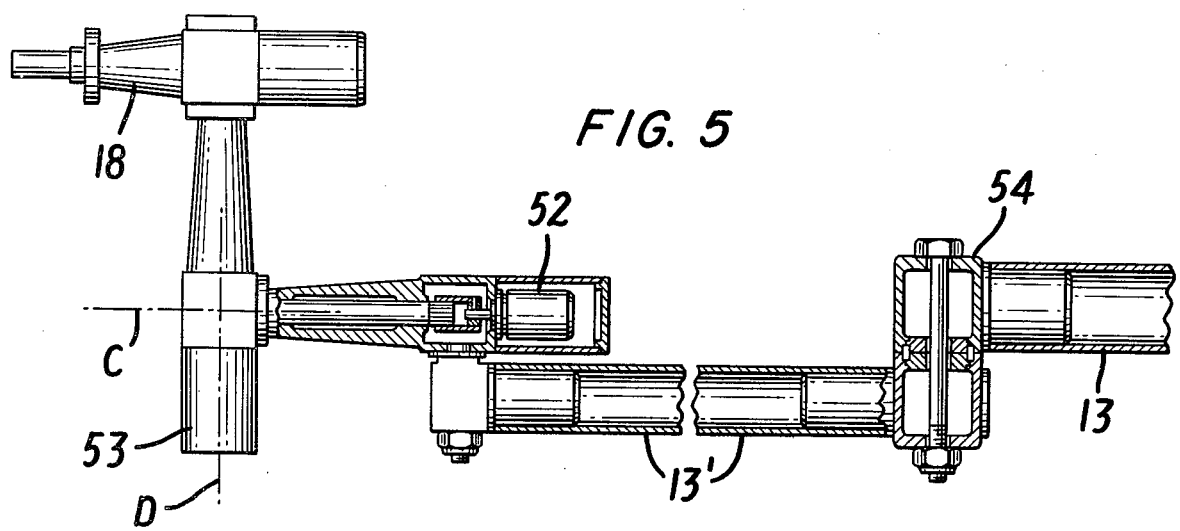

With respect to the control structure 29, the more exact, preferred construction is shown by FIGS. 4 and 5. The tower 2 is mounted on the base 30 by mounting control means, comprising a flange 37, secured to the bottom of this tower for example by welding 38 and removably secured to the base for example by bolts 39. Thus, the entire control structure can be freely removed from the base, once that it has been used to provide the desired painting program, thereby making this structure available for other uses, and protecting it from the atmosphere of the paint sprayed by gun 18a of painting robot 22.

The tower 2 has an axis A, which as shown in FIG. 3 is normally vertically oriented. At the top of the tower there is provided a first control connector comprising a primary tower extension 40 (FIG. 4) rotatable about the axis A by simple, light-weight bearing means 41. This extension in turn carries a secondary extension 42 mounted laterally of 40 and rotatable about generally similar bearing means 43. The arm 6 is secured to extension 42, as shown, so that by means of extension 40 and 42, this arm can be rotated about the axis A and also about a second axis B which intersects the axis A at right angles thereto.

The exact extent of such rotation or rotations is sensed by transducers 44 on extension 40 in line with axis A and 45 on extension 42 in line with axis B. Each transducer has electrical connection leads, schematically shown at 46,47 respectively. It will be understood by persons skilled in the art that these electrical leads are suitably combined into a cable of the type indicated in FIG. 1 at 11 and suitably connected to the electronic program storing apparatus 8.

While accordingly arm 6 has two degrees of freedom relative to tower 2, about axis A and axis B, arm 13 has only a single degree of freedom relative to arm 6, being mounted on a second control connector comprising an extension 48 of arm 6 for rotation about a bearing 49 and for sensing of the rotation by a transducer 50 with leads 51, in ways similar to those described with respect to the bearing and transducer structure 40 to 47.

As further shown in FIG. 5, the spray gun 18 in turn is mounted on an extension 13' of arm 13 with two degrees of freedom about an axis C parallel to extension 13' and about an axis D intersecting this axis C at right angles thereto, by a third control connector which has corresponding bearings, similar to those already described and not shown in detail; it also has corresponding transducers, generally shown at 52, 53.

A connection between arm 13 and extension 13' thereof can be effected by a bolt and nut structure 54 which remains rigid in use. This structure 54 is adjusted to accomodate the teaching apparatus to different workpieces.

As further shown in FIG. 3, the painting robot 22, on tower 2a, has first and second arms 6a, 13a rotatably interconnected at 12a, the second arm having rigid connection 13a" to an extension 13a', and being rotatably connected to spray gun 18a at 17a, as already described.

Figure 6:
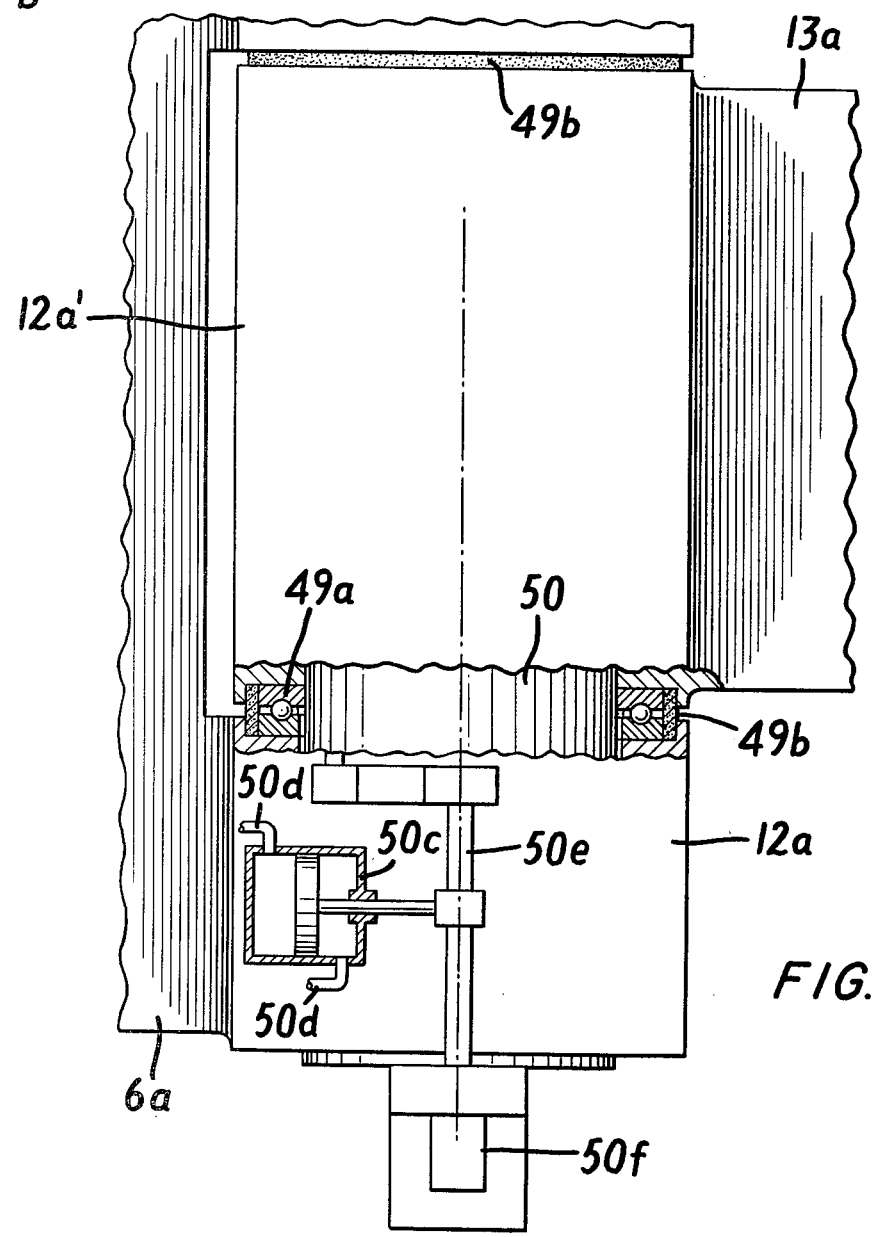

One of the rotatable connections of painting robot 22 is best shown in FIG. 6. It provides low-friction bearing means 49a sealed by suitable seal means 49b against any entry of spray paint, from the atmosphere of the robot's working-place, into the bearing means or adjacent structures. For proper sealing and low-friction connection, between the illustrated arms 6a, 13a, these structures 49a, 49b are relatively large, and correspondingly the arms themselves and their connecting end-pieces 12a, 12a' are relatively wide, in comparison with the corresponding arms 6,13 of the control structure 29. The end pieces define a closed housing for an automatic arm-manipulating device, shown as comprising a hydraulic piston and cylinder device 50c, connected by hydraulic leads 50d (under the control of electric pilot valve means, not shown, controlled by the electronic program in apparatus 8) to a suitable hydraulic power source (not shown), in order to effect, by a piston mechanism 50e, 50f, the required rotational, relative movements of the arms.

What is claimed is:

1. For use with a robot having a relatively massive multiple-arm system having a free end moved controllably in a work space in three dimensions under command of command signals, means to mount on said free end a tool to be positioned in said work space and progressively moved in said space, a manually operable teaching system mountable in said work space in which the robot is to move said free end and tool thereon and having a lightweight multiple-arm system constructed symmetrical to the multiple-arm system of said robot with a second free end for mounting thereon a second tool similar to the first-mentioned tool movable manually in said work space progressively in three dimensions in a work pattern in said work space corresponding to desired movement of the first-mentioned tool in said work space, means to develop signals representative of the spatial work pattern of movement of said second free end of the teaching system and a tool thereon, means to memorize said signals, and means to apply command signals to said multiple-arm system of the robot developed from said memorized signals and to cause the multiple-arm system of the robot and first-mentioned free end to duplicate the movements of the free end of the teaching system effected within said work space.

2. The teaching system according to claim 1, including a rotatable base mounting the robot multiple-arm system and the teaching system multiple-arm system in common.

3. The teaching system according to claim 1, in which the multiple-arm system of the teaching system is a lightweight duplicate of the massive multiple-arm system of the robot.

* * * * *